United States Patent
Shokaku

(10) Patent No.: US 11,358,587 B2
(45) Date of Patent: Jun. 14, 2022

(54) ENGINE CONTROL DEVICE FOR VEHICLE INCLUDING ACCELERATION ASSIST CONTROL

(71) Applicant: HONDA MOTOR CO., LTD., Tokyo (JP)

(72) Inventor: Isao Shokaku, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 47 days.

(21) Appl. No.: 16/496,208

(22) PCT Filed: Mar. 16, 2018

(86) PCT No.: PCT/JP2018/010649
§ 371 (c)(1),
(2) Date: Sep. 20, 2019

(87) PCT Pub. No.: WO2018/173982
PCT Pub. Date: Sep. 27, 2018

(65) Prior Publication Data
US 2020/0047744 A1    Feb. 13, 2020

(30) Foreign Application Priority Data
Mar. 23, 2017   (JP) .............................. JP2017-057267

(51) Int. Cl.
*B60W 30/00*      (2006.01)
*B60W 20/40*      (2016.01)
(Continued)

(52) U.S. Cl.
CPC ............. *B60W 20/40* (2013.01); *B60K 17/02* (2013.01); *F16H 45/02* (2013.01);
(Continued)

(58) Field of Classification Search
CPC ......... B60W 20/40; B60W 2510/0216; B60W 2300/36; B60W 2540/10;
(Continued)

(56) References Cited

U.S. PATENT DOCUMENTS 7,392,870 B2 *   7/2008   Kojima ..................... B62M 7/12
                                                            180/65.25
7,730,983 B2     6/2010   Tanaka et al.
(Continued)

FOREIGN PATENT DOCUMENTS

EP     3064748 A1    9/2016
FR     2908476 A1    5/2008
(Continued)

OTHER PUBLICATIONS

Extended European Search Report dated Mar. 23, 2020 in the corresponding EP Application No. 18770904.3.
(Continued)

*Primary Examiner* — David Hamaoui
(74) *Attorney, Agent, or Firm* — Carrier Blackman & Associates, P.C.; Joseph P. Carrier; Jeffrey T. Gedeon

(57) ABSTRACT

An engine control device for a saddle riding vehicle includes a mechanical centrifugal clutch for connecting and disconnecting driving force from an engine to a driving wheel, a throttle operator to adjust output power of the engine, a motor to rotate a crankshaft of the engine, and a control unit to control the motor and a fuel injection system. The control unit executes injection stopping control for stopping fuel injection during deceleration of the vehicle and executes, when an opening operation of the throttle operator is performed after an engine speed becomes equal to or lower than a centrifugal clutch disconnection speed at which the centrifugal clutch is disconnected, acceleration assist control for rotating the crankshaft with the motor.

1 Claim, 14 Drawing Sheets

(51) Int. Cl.
*B60K 17/02* (2006.01)
*F16H 45/02* (2006.01)
*F16H 61/00* (2006.01)
*B60K 15/03* (2006.01)
*F16H 59/36* (2006.01)

(52) U.S. Cl.
CPC ........... *B60K 2015/0319* (2013.01); *B60W 2510/0216* (2013.01); *F16H 2059/366* (2013.01); *F16H 2061/0015* (2013.01)

(58) Field of Classification Search
CPC ......... B60W 2510/0638; B60W 50/06; B60W 10/06; B60W 10/08; B60W 20/19; B60K 17/02; B60K 2015/0319; B60K 6/38; B60K 6/485; B60K 6/20; F16H 45/02; F16H 2061/0015; F16H 2059/366; F02N 11/04; F02N 99/006; F02N 2200/022; F02N 11/0844; F02D 2250/24; F02D 41/08; F02D 41/022; F02D 41/123; H02P 9/06; H02P 9/48
See application file for complete search history.

(56) References Cited

U.S. PATENT DOCUMENTS

| | | | | |
|---|---|---|---|---|
| 8,433,502 B2 * | 4/2013 | Minamitani | ........ | F02N 11/0822 701/112 |
| 8,566,007 B2 * | 10/2013 | Shoda | ........ | F02N 11/0855 701/104 |
| 8,755,980 B2 * | 6/2014 | Sawada | ........ | F02D 41/022 701/54 |
| 9,631,596 B2 * | 4/2017 | Kitano | ........ | F02N 11/0844 |
| 10,179,506 B2 | 1/2019 | Yagyu et al. | | |
| 2015/0369199 A1 * | 12/2015 | Nakamura | ........ | F02D 13/0211 123/179.4 |
| 2019/0135102 A1 * | 5/2019 | Meguro | ........ | B60L 50/13 |

FOREIGN PATENT DOCUMENTS

| | | | |
|---|---|---|---|
| JP | H03-148332 A | | 6/1991 |
| JP | H10-339187 A | | 12/1998 |
| JP | 2001-098978 A | | 4/2001 |
| JP | 2006-054940 A | | 2/2006 |
| JP | 2007-177870 A | | 7/2007 |
| JP | 2007177870 A | * | 7/2007 |
| JP | 2008-024255 A | | 2/2008 |
| JP | 2014-133489 A | | 7/2014 |
| JP | 2016-125426 A | | 7/2016 |
| WO | 2014/112173 A1 | | 7/2014 |
| WO | WO-2014112173 A1 | * | 7/2014 .......... F02N 11/0822 |

OTHER PUBLICATIONS

Forms PCT/IB/308 and PCT/IPEA/409 from International Application PCT/JP2018/010649, of which this application is a National Phase of.

* cited by examiner

<WHEN THE MOTORCYCLE ENTERS AN IDLE STOP STATE>

<IN THE CASE WHERE A THROTTLE OPERATION IS PERFORMED AFTER THE CENTRIFUGAL CLUTCH IS DISCONNECTED AND BEFORE FUEL INJECTION IS RESTARTED>

<WHEN THE MOTORCYCLE ENTERS AN IDLE STOP STATE (MOTOR IDLE)>

<IN THE CASE WHERE A THROTTLE OPERATION IS PERFORMED DURING MOTOR IDLE OPERATION IS EXECUTED>

ENGINE CONTROL DEVICE FOR VEHICLE INCLUDING ACCELERATION ASSIST CONTROL

TECHNICAL FIELD

The present invention relates to an engine control device for a vehicle, and particularly to an engine control device for a vehicle applied to a vehicle in which a centrifugal clutch is used for connection and disconnection of engine driving force.

BACKGROUND ART

Conventionally, a configuration is known by which, in order to improve the fuel cost of a vehicle that uses an engine as a power source, in the case where there is no acceleration request, fuel injection is stopped even during rotation of the engine. In the case where such stopping control of fuel injection like this is performed, a scheme is required for suppressing a driver from having a disagreeable feeling when fuel injection is restarted.

Patent Literature 1 discloses an engine control device for a vehicle including a torque converter and a lockup clutch, which is configured such that, after fuel injection is stopped due to absence of an acceleration request, if the engine speed becomes lower than a predetermined value in a state in which the lockup clutch is connected, then fuel injection is restarted such that a lean combustion state is established, and after fuel injection is restarted, the lockup clutch is disconnected. According to this configuration, while torque variation is suppressed, engine stall can be prevented by lean combustion.

CITATION LIST

Patent Literature

Patent Document 1: JP 2001-98978 A

SUMMARY OF INVENTION

Technical Problem

Incidentally, different from such an electronically controlled clutch as disclosed in Patent Literature 1, in a mechanical centrifugal clutch with which the connection/disconnection state of engine driving force changes over at a predetermined speed, the connection state cannot be changed over arbitrarily. In a vehicle in which such a centrifugal clutch like this is applied to a start clutch, it can be considered that, in the case where fuel injection is stopped upon deceleration in order to improve the fuel cost, also after the centrifugal clutches changes over to a disconnection state, the stopping state of fuel injection is continued until just before the engine stops. However, in the case where an acceleration request is issued during disconnection of the centrifugal clutch, even if fuel injection is restarted, some period of time is required before the engine speed increases until the centrifugal clutch is connected. This gives rise to a subject that some delay is liable to occur in acceleration response.

The object of the present invention resides in provision of an engine control device for a saddle riding (saddled) vehicle that can solve the subject of the prior art described above and can improve the acceleration response from a state in which the engine speed is lower than an engine speed at which a centrifugal clutch is disconnected.

Solution to Problems

To achieve the afore-mentioned object, the present invention has a first feature in that an engine control device for a vehicle applied to a vehicle (1) includes a mechanical centrifugal clutch (C) for connecting and disconnecting driving force to be transmitted from an engine (E) to a driving wheel (WR), wherein the vehicle (1) includes a throttle operator (47) configured to adjust output power of the engine (E), a motor (8) configured to rotate a crankshaft (2) of the engine (E), and a control unit (100) configured to control the motor (8) and a fuel injection system (52), and the control unit (100) executes injection stopping control for stopping fuel injection during deceleration of the vehicle (1) and executes, when an opening operation of the throttle operator (47) is performed after an engine speed (Ne) becomes equal to or lower than a centrifugal clutch disconnection speed (Ne3) at which the centrifugal clutch (C) is disconnected, acceleration assist control for rotating the crankshaft (2) with the motor (8).

To achieve the afore-mentioned object, the present invention has a second feature in that when the engine speed (Ne) decreases to an injection restart speed (Ne2) that is lower than the centrifugal clutch disconnection speed (Ne3) after fuel injection by the injection stopping control stops, the control unit (100) causes the fuel injection to be restarted.

To achieve the afore-mentioned object, the present invention has a third feature in that the injection restart speed (Ne2) at which the fuel injection is to be restarted is higher than an idle speed (Ne1).

To achieve the afore-mentioned object, the present invention has a fourth feature in that when the engine (E) is caused to operate with an idle speed (Ne1), the control unit (100) executes idle assist control for causing the motor (8) to rotate the crankshaft (2).

To achieve the afore-mentioned object, the present invention has a fifth feature in that an engine control device for a vehicle applied to a vehicle (1) includes a mechanical centrifugal clutch (C) for connecting and disconnecting driving force to be transmitted from an engine (E) to a driving wheel (WR), wherein the vehicle (1) includes a throttle operator (47) configured to adjust output power of the engine (E), a motor (8) configured to rotate a crankshaft (2) of the engine (E), and a control unit (100) configured to control the motor (8) and a fuel injection system (52), the control unit (100) causes fuel injection to be stopped during deceleration of the vehicle (1) and executes, when an opening operation of the throttle operator (47) is performed after an engine speed (Ne) becomes equal to or lower than a centrifugal clutch disconnection speed (Ne3) at which the centrifugal clutch (C) is disconnected, acceleration assist control for causing the motor (8) to rotate the crankshaft (2), the control unit (100) executes, when the engine (E) is to be caused to operate with an idle speed (Ne1), idle assist control for causing the motor (8) to rotate the crankshaft (2), and the idle assist control is control for causing the engine (E) to operate with the idle speed (Ne1) only by driving force of the motor (8).

Effects of Invention

According to the first feature of the present invention, an engine control device for a vehicle applied to a vehicle (1) includes a mechanical centrifugal clutch (C) for connecting and disconnecting driving force to be transmitted from an engine (E) to a driving wheel (WR), wherein the vehicle (1) includes a throttle operator (47) configured to adjust output power of the engine (E), a motor (8) configured to rotate a crankshaft (2) of the engine (E), and a control unit (100) configured to control the motor (8) and a fuel injection system (52), and the control unit (100) executes injection stopping control for stopping fuel injection during deceleration of the vehicle (1) and executes, when an opening operation of the throttle operator (47) is performed after an engine speed (Ne) becomes equal to or lower than a centrifugal clutch disconnection speed (Ne3) at which the centrifugal clutch (C) is disconnected, acceleration assist control for rotating the crankshaft (2) with the motor (8). Therefore, since fuel injection is stopped during deceleration of the vehicle, the fuel consumption can be suppressed and an acceleration delay in the case where the throttle is operated for opening in a state in which the centrifugal clutch is disconnected can be reduced.

Particularly, even if the throttle is operated for opening in a state in which the centrifugal clutch is disconnected, the vehicle is accelerated actually only after the centrifugal clutch is connected after the engine speed starts increase, and therefore, a delay is likely to occur in acceleration response to the opening operation of the throttle. However, since the crankshaft is accelerated by the motor in response to an opening operation of the throttle, the time required until the centrifugal clutch is connected can be reduced to improve the acceleration response.

According to the second feature of the present invention, when the engine speed (Ne) decreases to an injection restart speed (Ne2) that is lower than the centrifugal clutch disconnection speed (Ne3) after fuel injection by the injection stopping control stops, the control unit (100) causes the fuel injection to be restarted. Therefore, the fuel consumption amount can be suppressed by elongating the stop period of fuel injection. Further, although it is necessary to restart injection in order to transit to idle operation after fuel injection is stopped upon deceleration, by executing the restart of fuel injection after the centrifugal clutch is disconnected, it is possible to transit to idle operation without having an influence on the driving force to be transmitted to the driving wheel.

According to the third feature of the present invention, the injection restart speed (Ne2) at which the fuel injection is to be restarted is higher than an idle speed (Ne1). Therefore, even in the case where some ignition delay or the like occurs upon restart of injection, it is possible to transit to idle operation smoothly without causing such a situation that the engine speed becomes lower than the idle speed or engine stall occurs.

According to the fourth feature of the present invention, when the engine (E) is caused to operate with an idle speed (Ne1), the control unit (100) executes idle assist control for causing the motor (8) to rotate the crankshaft (2). Therefore, for example, by performing idle operation using both of fuel injection and idle assist control, it is possible to reduce the fuel consumption amount upon idle operation.

According to the fifth feature of the present invention, an engine control device for a vehicle applied to a vehicle (1) includes a mechanical centrifugal clutch (C) for connecting and disconnecting driving force to be transmitted from an engine (E) to a driving wheel (WR), wherein the vehicle (1) includes a throttle operator (47) configured to adjust output power of the engine (E), a motor (8) configured to rotate a crankshaft (2) of the engine (E), and a control unit (100) configured to control the motor (8) and a fuel injection system (52), the control unit (100) causes fuel injection to be stopped during deceleration of the vehicle (1) and executes, when an opening operation of the throttle operator (47) is performed after an engine speed (Ne) becomes equal to or lower than a centrifugal clutch disconnection speed (Ne3) at which the centrifugal clutch (C) is disconnected, acceleration assist control for causing the motor (8) to rotate the crankshaft (2), the control unit (100) executes, when the engine (E) is to be caused to operate with an idle speed (Ne1), idle assist control for causing the motor (8) to rotate the crankshaft (2), and the idle assist control is control for causing the engine (E) to operate with the idle speed (Ne1) only by driving force of the motor (8). Therefore, by stopping fuel injection during deceleration of the vehicle, the fuel consumption can be suppressed, and an acceleration delay in the case where the throttle is operated for opening in a state in which the centrifugal clutch is disconnected can be reduced. Further, since idle operation is performed only with the motor driving force, after fuel injection is stopped once upon deceleration, there is no necessity to inject the fuel before restart of the vehicle, and the fuel consumption amount can be reduced further.

DESCRIPTION OF EMBODIMENTS

Figure 1:
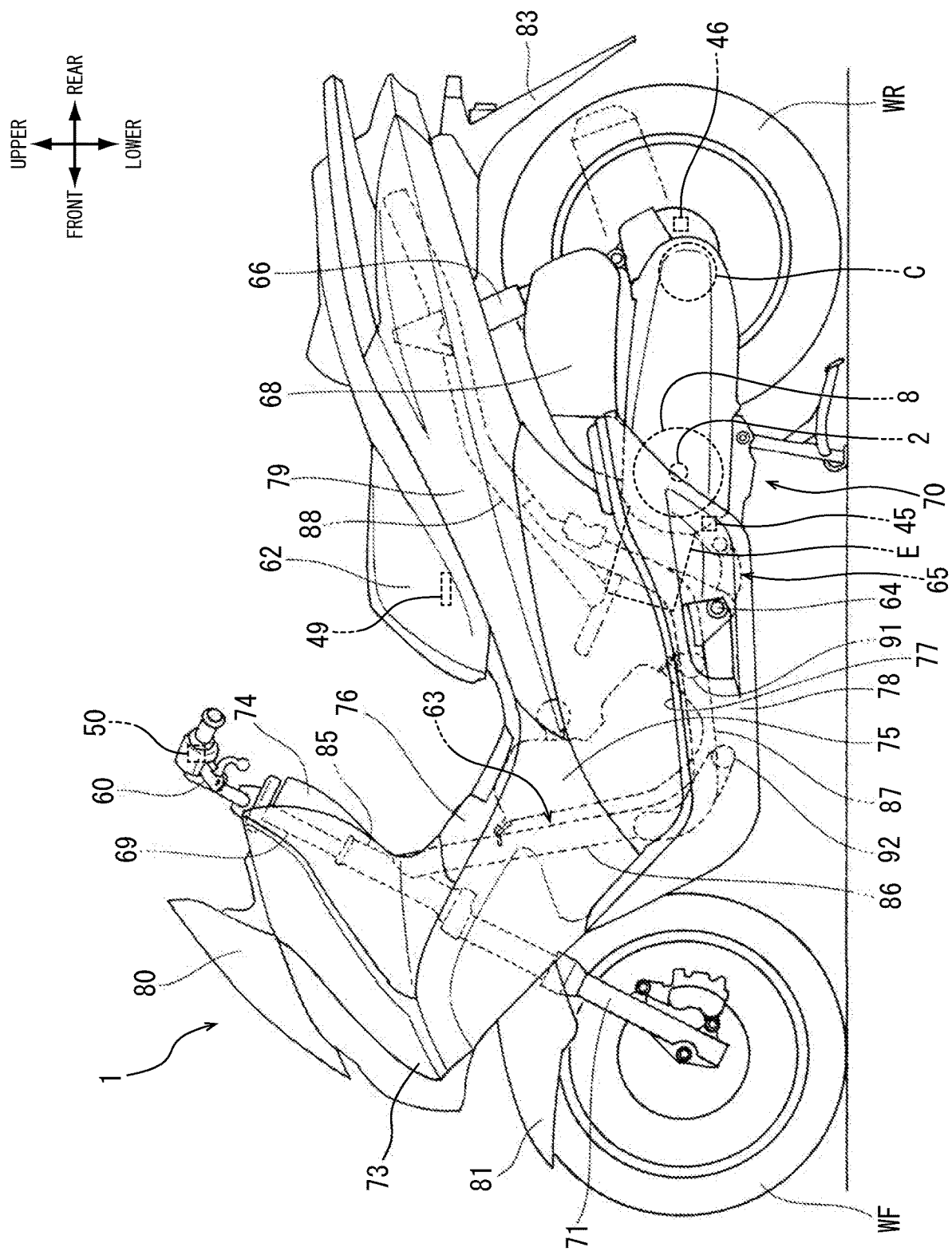
FIG. 1 is a left side elevational view of a motorcycle to which an engine control device for a vehicle according to an embodiment of the present invention is applied.

In the following, a preferred embodiment of the present invention is described in detail with reference to the drawings. FIG. 1 is a left side elevational view of a motorcycle 1 to which an engine control device for a vehicle according to an embodiment of the present invention is applied. The motorcycle 1 is a saddle riding (saddled) vehicle of the scooter type that includes a front wheel WF supported for steering movement by a steering handlebar 60, a rear wheel WR supported at a rear portion of a swing unit 70 that configures an engine E and a transmission integrally, and a seat 62 provided between the front wheel WF and the rear wheel WR such that a passenger is seated astride the seat 62. To a crankshaft 2 of the engine E, an alternating-current generating (ACG) starter motor 8 is attached which rotates the crankshaft 2 when power is supplied thereto and functions, after the engine E is started, as a generator. Further, the motorcycle 1 has an idle stop function of stopping the engine E if a predetermined stopping condition is satisfied and restarting the engine E if a predetermined restarting condition is satisfied.

The motorcycle 1 includes a vehicle body frame 63, and a link mechanism 65 extends rearwardly of the vehicle from the vehicle body frame 63 through a link pivot 64 as a shaft member. The swing unit 70 is supported for rocking motion with respect to the vehicle body frame 63 by the link mechanism 65. The steering handlebar 60 is fixed to an upper end portion of a steering stem 69, and a pair of left and right front forks 71 for supporting the front wheel WF for rotation thereon is fixed to a lower end portion of the steering stem 69.

The swing unit 70 has an elongated shape in which a cylinder axial line of the engine E is inclined by a great amount toward the front side of the vehicle body and a transmission case of the transmission is disposed on the vehicle body rear side of the crankshaft 2. On the vehicle body rear side of the transmission case, a mechanical centrifugal clutch C is disposed. An engine speed (Ne) sensor 45 is disposed in the proximity of the ACG starter motor 8, and a vehicle speed sensor 46 is disposed in the proximity of the axle of the rear wheel WR.

The vehicle body frame 63 includes a head pipe 85 at a front end portion of which the steering stem 69 is supported for rotation, a down frame 86 extending rearwardly downwards of the vehicle from the head pipe 85, a pair of left and right lower frames 87 extending rearwardly of the vehicle from a lower portion of the down frame 86, and a seat frame 88 extending rearwardly upwards of the vehicle from a rear end portion of the lower frames 87 and supporting the seat 62 thereon. Between a rear portion of the swing unit 70 that has a function also of a swing arm and the seat frame 88, a cushion unit 66 is interposed. An air cleaner box 68 is provided on an upper face of the swing unit 70.

A cross frame 91 bridges the pair of left and right lower frames 87 such that it is directed in a vehicle widthwise direction, and a front cross frame 92 bridges between the pair of left and right lower frames 87 on the front side of the vehicle with respect to the cross frame 91 such that it is directed in the vehicle widthwise direction while a lower end of the down frame 86 is connected to a front face of the front cross frame 92.

On the outer side of the vehicle body frame 63, a front cover 73 that covers a front portion of the vehicle body, a floor panel 74 attached so as to cover the steering stem 69 from the rear of the front cover 73, a pair of left and right side covers 75 extending rearwardly of the vehicle body from an end portion of the front cover 73, a tunnel member 76 that bridges the left and right side covers 75 in front of the seat 62, a pair of left and right under covers 78 on each of which a step floor 77 on which the driver is to place its feet is formed, and left and right rear side covers 79 extending rearwardly of the vehicle body from a lower portion of the seat 62 are disposed. A windshield 80 is attached to an upper end of the front cover 73. A front fender 81 is disposed above the front wheel WF, and a rear fender 83 is disposed rearwardly upwardly of the rear wheel WR.

On the right side of the steering handlebar 60, a throttle opening sensor 50 for detecting the opening of a throttle grip for being operated by the driver is disposed, and a seating sensor 49 for detecting a seated state of the driver is disposed in the inside of the seat 62.

Figure 2:
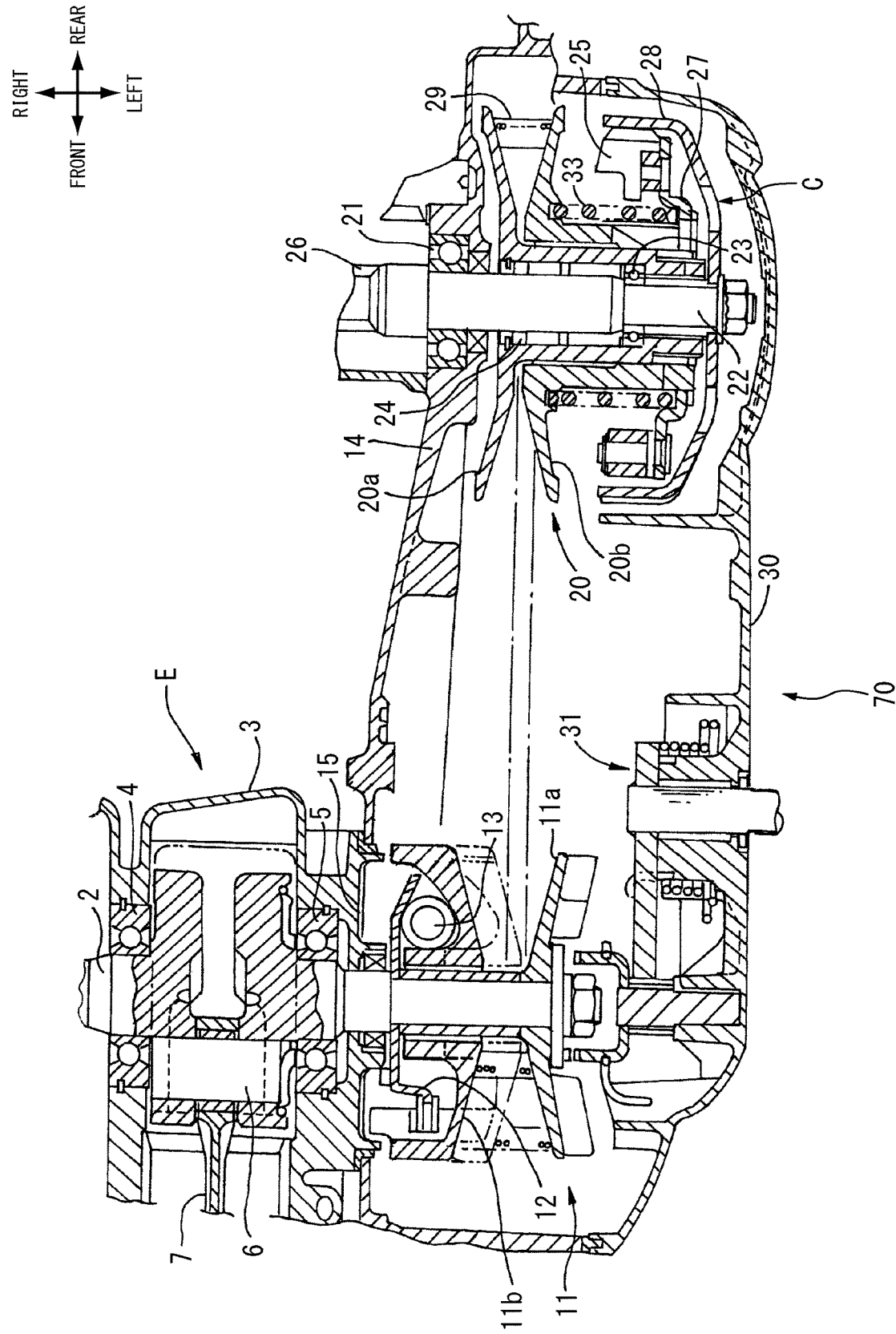
FIG. 2 is a sectional view of the swing unit.
Figure 3:
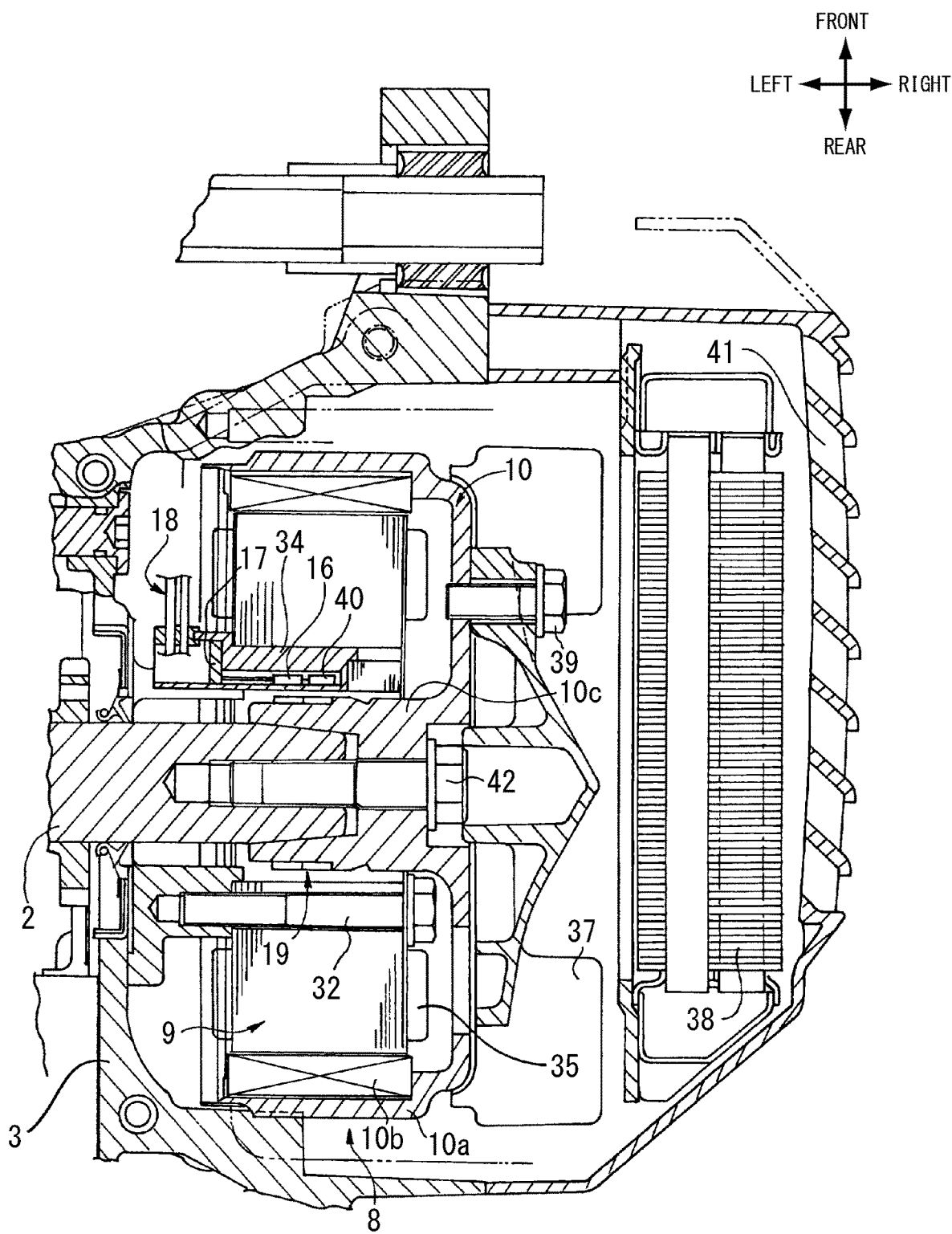
FIG. 3 is a sectional view of the ACG starter motor.

FIG. 2 is a sectional view of the swing unit 70. FIG. 3 is a sectional view of the ACG starter motor 8. The crankshaft 2 of the engine E is supported by bearings 4 and 5 fitted in a crankcase 3. A connecting rod 7 is connected to the crankshaft 2 through a crankpin 6, and a driving side pulley 11 of a V-belt type continuously variable transmission is provided on the outer side in the widthwise direction of the bearing 5. The driving side pulley 11 includes a fixed pulley piece 11a and a movable pulley piece 11b, and the fixed pulley piece 11a is fixed to a rather near end portion of the crankshaft 2.

The movable pulley piece 11b is coupled against rotation in a circumferential direction but for sliding movement in an axial direction with respect to the crankshaft 2. The movable pulley piece 11b is engaged for sliding movement by a ramp plate 12 that is coupled for integral rotation to the crankshaft 2. The ramp plate 12 is disposed in an opposing relationship to an inner side inclination of the movable pulley piece 11b such that it forms a tapering guide for a roller weight 13, whose width decreases in a direction toward the outer circumference.

A driven side pulley 20 is paired with the driving side pulley 11 to configure the continuously variable transmission. A driven shaft 22 is supported for rotation by a bearing 21 fitted in a transmission case 14, and the driven side pulley 20 is attached to the driven shaft 22. The driven side pulley 20 includes a fixed pulley piece 20a supported for rotation but against sliding movement in an axial direction of the driven shaft 22 with respect to the driven shaft 22 by bearings 23 and 24, and a movable pulley piece 20b supported against rotation in a circumferential direction but for sliding movement in an axial direction with respect to the driven shaft 22.

On the fixed pulley piece 20a, a shoe supporting plate 27 is provided which supports a clutch shoe 25 that is displaced in a direction toward the outer circumference by centrifugal force. To the driven shaft 22, a clutch outer 28 is fixed which has an inner circumferential face with which the clutch shoe 25 is to abut, and the centrifugal clutch C is configured from the combination of the clutch outer 28 and the clutch shoe 25. The movable pulley piece 20b is pressed by one end of a coil spring 33 that is held at the other end thereof by the shoe supporting plate 27 such that the movable pulley piece 20b is normally biased to the fixed pulley piece 20a side.

A V belt 29 extends between the driving side pulley 11 and the driven side pulley 20. The driven shaft 22 is connected to the rear wheel WR through a speed reducer including a reduction gear 26. A cover 30 that supports a kick starter 31 covers the outer side of the transmission case 14 in the vehicle widthwise direction.

Referring to FIG. 3, the ACG starter motor 8 includes a stator 9 on which three-phase windings are wound, and an outer rotor 10 coupled to an end portion of the crankshaft 2 such that it rotates along an outer circumference of the stator 9. The outer rotor 10 includes a cup-shaped rotor case 10a connected to the crankshaft 2 and a magnet 10b accommodated in an inner circumferential face of the rotor case 10a.

The outer rotor 10 is fixed by a bolt 42 that is attached such that the inner circumference of a hub portion 10c is fitted with a distal end tapering portion of the crankshaft 2 and extends through the center of the hub portion 10c until it is fitted with an end portion thread of the crankshaft 2. The stator 9 disposed on the inner circumference side of the outer rotor 10 is fixed to the crankcase 3 by a bolt 32. A fan 37 is fixed to the outer rotor 10 by a bolt 39. A radiator 38 is provided adjacent the fan 37 and is covered with a fan cover 41.

A sensor case 34 is fitted on the inner circumference of the stator 9, and rotor angle sensors 40 and ignition pulsers 16 are provided at equal distances along an outer circumference of a boss of the outer rotor 10 in the sensor case 34. The rotor angle sensors 40 are used for energization control of a stator coil 35 of the ACG starter motor 8 and are provided one by one in a corresponding relationship to the U phase, V phase and W phase of the ACG starter motor 8. The rotor angle sensors 40 and the ignition pulsers 16 can each be configured from a Hall integrated circuit (IC) or a magneto-resistive element. It is to be noted that each rotor angle sensor 40 may be used as an engine speed sensor.

Leads of the rotor angle sensors 40 and the ignition pulsers 16 are connected to a board 17, and a wire harness 18 is coupled to the board 17. A magnet ring 19 is fitted on an outer circumference of the boss 10c of the outer rotor 10 and is magnetized to two stages so as to have a magnetic action to both of the rotor angle sensors 40 and the ignition pulsers 16. On one of the magnetized zones of the magnet ring 19 corresponding to the rotor angle sensors 40, N poles and S poles are formed such that they are arrayed alternatively at distances of a 30-degree width in a circumferential direction corresponding to the magnetic poles of the stator 9, and on the other magnetized zone of the magnet ring 19 corresponding to the ignition pulsers 16, a magnetized region is formed over a range of 15 degrees to 40 degrees at one place in the circumferential direction.

The ACG starter motor 8 functions as synchronous motor upon starting and is driven by current supplied from a battery to rotate the crankshaft 2 to start the engine E, but functions, after starting, as a synchronous generator such that it charges the battery with generated current and supplies current to the associated electric components.

Figure 4:
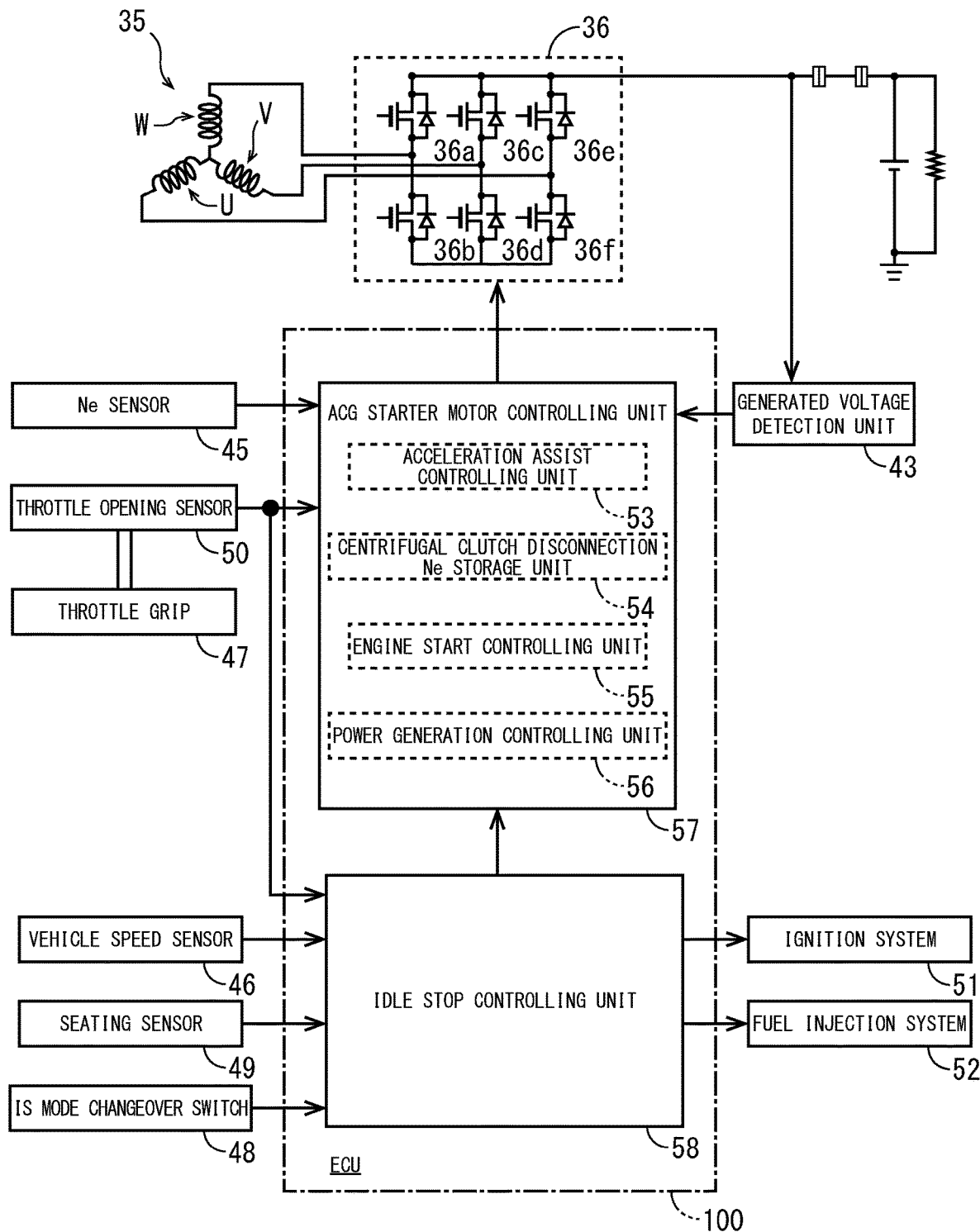
FIG. 4 is a block diagram depicting a configuration of an ECU that controls the ACG starter motor and peripheral equipment.

FIG. 4 is a block diagram depicting a configuration of an electronic control unit (ECU) 100 that controls the ACG starter motor 8 and peripheral equipment. A full wave rectifier 36 includes field effect transistors (FETs) 36a, 36b, 36c, 36d, 36e and 36f connected to the U, V and W phases of the stator coil 35 of the ACG starter motor 8. The ECU 100 as a control unit includes an ACG starter motor controlling unit 57 and an idle stop controlling unit 58. To the ACG starter motor controlling unit 57, a generated voltage detected by a generated voltage detection unit 43, an engine speed Ne detected by the Ne sensor 45 and an opening TH of the throttle grip as a throttle operator 47 detected by the throttle opening sensor 50 are inputted.

The ACG starter motor controlling unit 57 includes an acceleration assist controlling unit 53, a centrifugal clutch disconnection Ne storage unit 54, an engine start controlling unit 55 and a power generation controlling unit 56. The acceleration assist controlling unit 53 executes, when a predetermined condition is satisfied, acceleration assist control for increasing the rising rate of the engine speed Ne by the rotational driving force of the ACG starter motor 8. The centrifugal clutch disconnection Ne storage unit 54 is a memory for storing a designed engine speed Ne at which the mechanical centrifugal clutch C is disconnected. Further, the engine start controlling unit 55 performs switching control of the FETs 36a to 36f upon starting of the engine E such that the ACG starter motor 8 is driven as a synchronous generator. After the engine E is started, the power generation controlling unit 56 rectifies AC generated power of the ACG starter motor 8 with the FETs 36a to 36f to switch the FETs 36a to 36f with the power generation controlling unit 56 such that, during power generation by engine driving, retard angle energization or advance angle energization to the stator coil 35 may be performed to increase or decrease the power generation amount. It is to be noted that the retard angle energization and the advance angle energization signify that the stator coil 35 is energized retarding or advancing the electrical angle by an amount corresponding to a scheduled electrical angle from a detection signal upon change in magnetic pole of the magnetized zone of the magnet ring 19 detected by the rotor angle sensors 40.

On the other hand, to the idle stop controlling unit 58, output signals of the throttle opening sensor 50, the vehicle speed sensor 46, the seating sensor 49 and an idle stop (IS) mode changeover switch 48 are inputted. The IS mode changeover switch 48 is a switch that allows the passenger to arbitrarily select whether or not idle stop control is to be executed and is disposed on the steering handlebar 60 or the like. Using the conditions, for example, that the IS mode changeover switch 48 is on, that the throttle opening TH is zero, that a predetermined period of time elapses after the motorcycle 1 comes to a stopping state and that the driver is seated on the seat 62, the idle stop controlling unit 58 executes idle stop control for controlling an ignition system 51 and a fuel injection system 52 to temporarily stop the engine E and restarting the engine E in response to an opening operation of the throttle operator 47.

In the following, flows of controls executed by the engine control device according to the present embodiment are described with reference to time charts of FIGS. 5 to 10. The engine control device is configured such that, upon deceleration of the vehicle, fuel injection is stopped until the engine speed Ne becomes equal to or lower than a centrifugal clutch disconnection Ne to reduce the fuel consumption amount. Then, although, in the case where a throttle opening operation is performed after the engine speed Ne becomes equal to or lower than the centrifugal clutch disconnection Ne, a delay in acceleration response is likely to occur from the fact that some time is required until the centrifugal clutch C is connected, the engine control device is characterized in that the ACG starter motor 8 is drive to assist rise of the engine speed Ne to reduce the period of time required until the centrifugal clutch C is connected thereby to improve the acceleration response.

Figure 5:
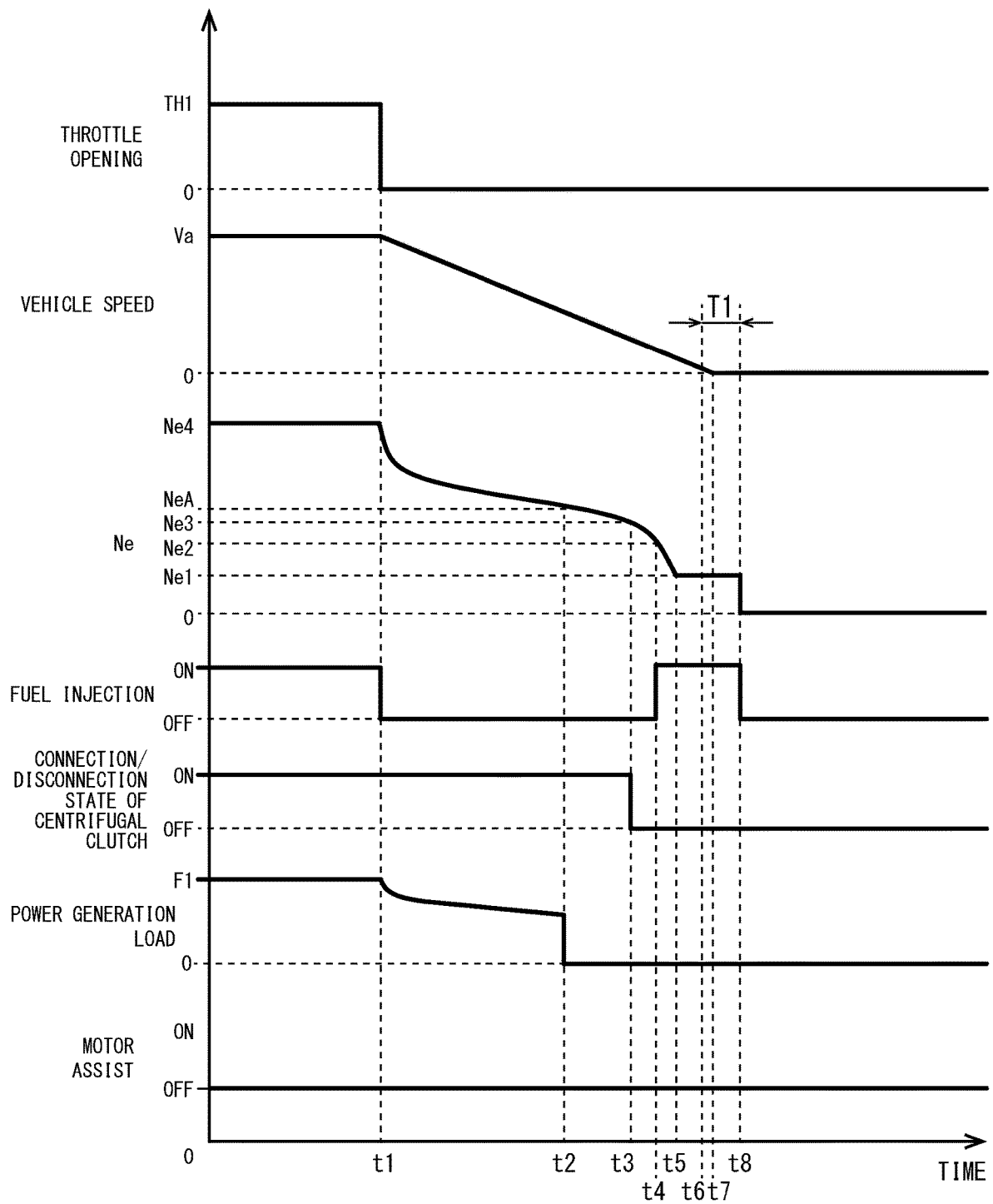
FIG. 5 is a time chart depicting a flow when the motorcycle enters an idle stop state with deceleration of the motorcycle.

FIG. 5 is a time chart depicting a flow when the motorcycle 1 enters an idle stop state with deceleration of the motorcycle 1. In this time chart, in order from above, the throttle opening TH, vehicle speed V, engine speed Ne, on/off state of fuel injection, on/off state (connection/disconnection state) of the centrifugal clutch C, power generation load F and on/off state of motor assist are indicated.

At time t=0, the motorcycle 1 is traveling with a throttle opening TH1 and at a vehicle speed Va and an engine speed Ne4. At this time, the fuel injection is in an on state, the centrifugal clutch is in an on state, the generation load is F1 and the motor assist is in an off state.

At time t1, in order to decelerate the vehicle, the throttle opening TH is reduced to zero by the driver. In the present embodiment, the fuel injection is set so as to be changed over to an off state (injection stop) in response to that the throttle opening TH becomes zero. In response to the injection stop, the vehicle speed V, engine speed Ne and power generation load F begin to decrease.

At time t2, the power generation load F is changed over to zero in response to that the engine speed Ne decreases to a power generation stop speed NeA (for example, 2500 rpm). At time t3, the engine speed Ne becomes equal to or lower than a centrifugal clutch disconnection speed Ne3 (for example, 2200 rpm) and the centrifugal clutch C is changed over to a disconnection state (clutch out).

It is to be noted that the power generation stop speed NeA is set to a speed higher than the centrifugal clutch disconnection speed Ne3. Consequently, upon deceleration of the vehicle, the feeling of braking by the power generation load F is removed first, and then the feeling of braking by the centrifugal clutch C is removed. Consequently, since the feeling of braking is removed stepwise, the feeling of idle running that is likely to occur when the centrifugal clutch C is disconnected can be suppressed.

At time t4, the engine speed Ne becomes equal to or lower than an injection restart speed Ne2 (for example, 1800 rpm) and fuel injection is restarted. This injection restart is executed in order to prevent the engine speed Ne from decreasing excessively and smoothly transit to idle operation.

At time t5, idle operation at an idle speed Ne1 (for example, 1400 rpm) is started. At this time, the motorcycle 1 still remains decelerating and the vehicle speed V is not zero as yet. At time t6, the vehicle speed V becomes equal to or lower than a predetermined value (for example, 3 km/h), and counting of an idle stop inrush timer is started. At time t7, the vehicle speed V becomes zero, and at time t8, the count value started at time t6 reaches a predetermined time period (for example, 0.5 seconds) T1, whereupon the fuel injection is turned off and the engine E enters a temporary stopping state.

It is to be noted that, although, in the present embodiment, temporary stop of the engine E is executed by stop of fuel injection, stop of the ignition system 51 may be executed together. Further, by setting the idle speed Ne1 (for example, 1400 rpm) to a speed higher than an operating speed (for example, 1200 rpm) of a mechanical decompression device that operates by centrifugal force, changeover noise between operation and nonoperation of the decompression device can be prevented from being generated during idle operation.

Figure 6:
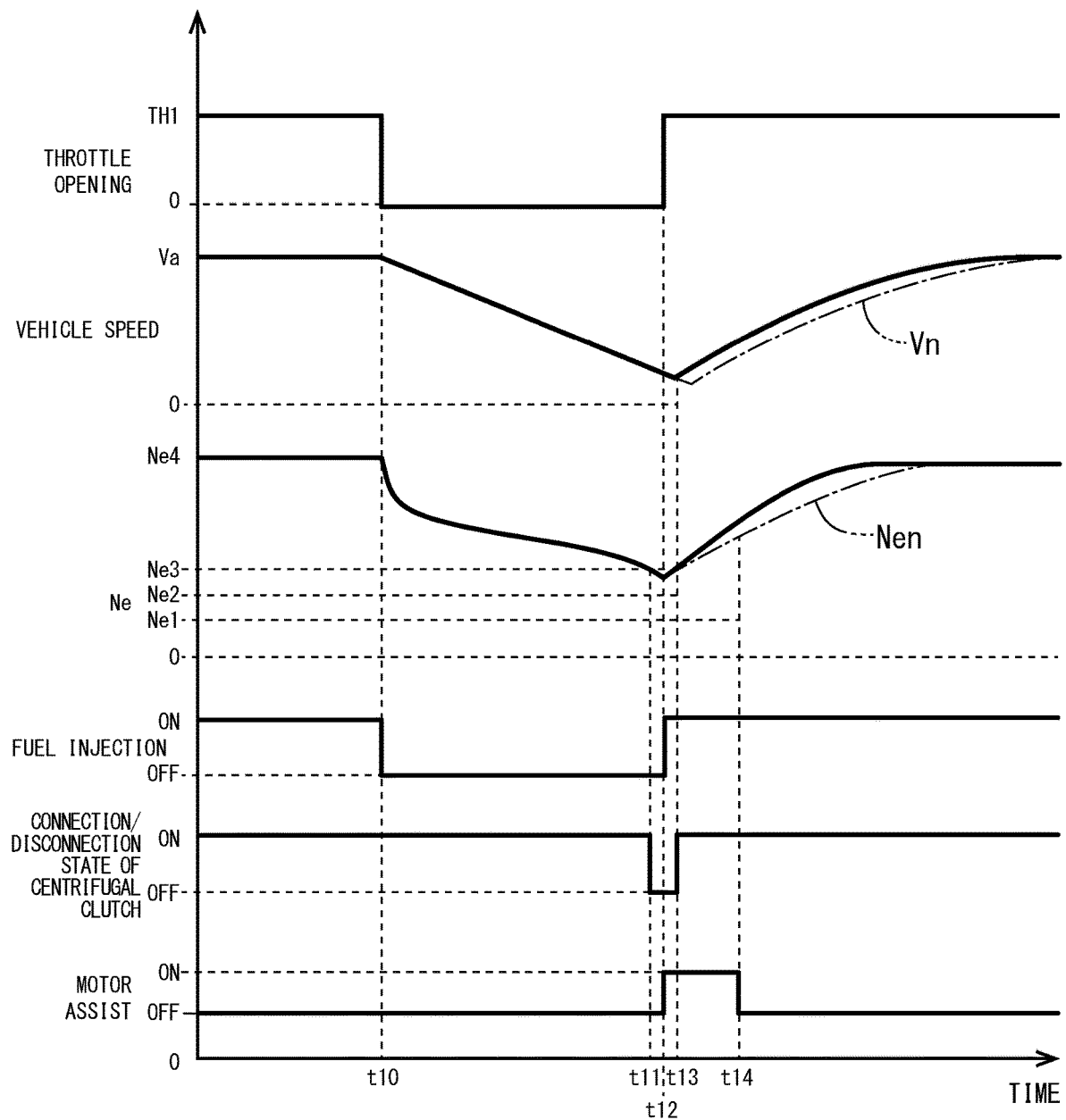
FIG. 6 is a time chart (pattern 2) depicting a flow in the case where a throttle operation is performed after the centrifugal clutch is disconnected with deceleration of the motorcycle.

FIG. 6 is a time chart depicting a flow in the case where a throttle operation is performed after the centrifugal clutch C is disconnected with deceleration of the motorcycle 1. In particular, a flow in the case of a "pattern 1" in which the throttle operator 47 is operated for opening within a period after the engine speed Ne becomes equal to or lower than the centrifugal clutch disconnection speed Ne3 until the engine speed Ne becomes the injection restart speed Ne2.

At time t=0, the motorcycle 1 is travelling with the throttle opening TH1 and at the vehicle speed Va and the engine speed Ne4. At this time, the fuel injection is in an on state; the centrifugal clutch is in an on state; the energization load is F1; and the motor assist is in an off state.

At time t10, the throttle opening TH is reduced to zero by the driver in order to decelerate the vehicle. In the present embodiment, fuel injection is set so as to be changed over to an off state (injection stop) in response to that the throttle opening TH decreases to zero.

At time t11, the engine speed Ne becomes equal to or lower than the centrifugal clutch disconnection speed Ne3, and the centrifugal clutch C is changed over to a disconnection state. Then, in this "pattern 1," the throttle opening TH is opened rapidly to a predetermined opening TH1 at time t12.

The engine control device according to the present embodiment is configured such that, in the case where the throttle operator 47 is operated for opening after the engine speed Ne becomes equal to or lower than the centrifugal clutch disconnection speed Ne3, normal fuel injection is started and acceleration assist by the ACG starter motor 8 is executed to quickly raise the engine speed Ne.

In particular, at time t12, normal fuel injection of the fuel injection system 52 is started by the idle stop controlling unit 58 (refer to FIG. 4), and acceleration assist driving of the ACG starter motor 8 is started by the acceleration assist controlling unit 53. Consequently, the engine speed Ne increases quickly in comparison with Nen (indicated by a one-dot chain line in FIG. 6) in the case where there is no acceleration assist. As a result, the centrifugal clutch C is connected at time t13 and the timing at which the vehicle speed V starts its increase comes earlier in comparison with Vn (indicated by a one-dot chain line in FIG. 6) in the case where there is no acceleration assist, and the acceleration response is improved.

It is to be noted that, in the example of FIG. 6, also after the engine speed Ne becomes equal to or higher than the centrifugal clutch disconnection speed Ne3 at time t13, the acceleration assist by the ACG starter motor 8 continues to be executed till time t14. The period of time for which acceleration assist is performed can be set so as to increase as the amount ΔTH of change of the throttle opening TH increases.

Figure 7:
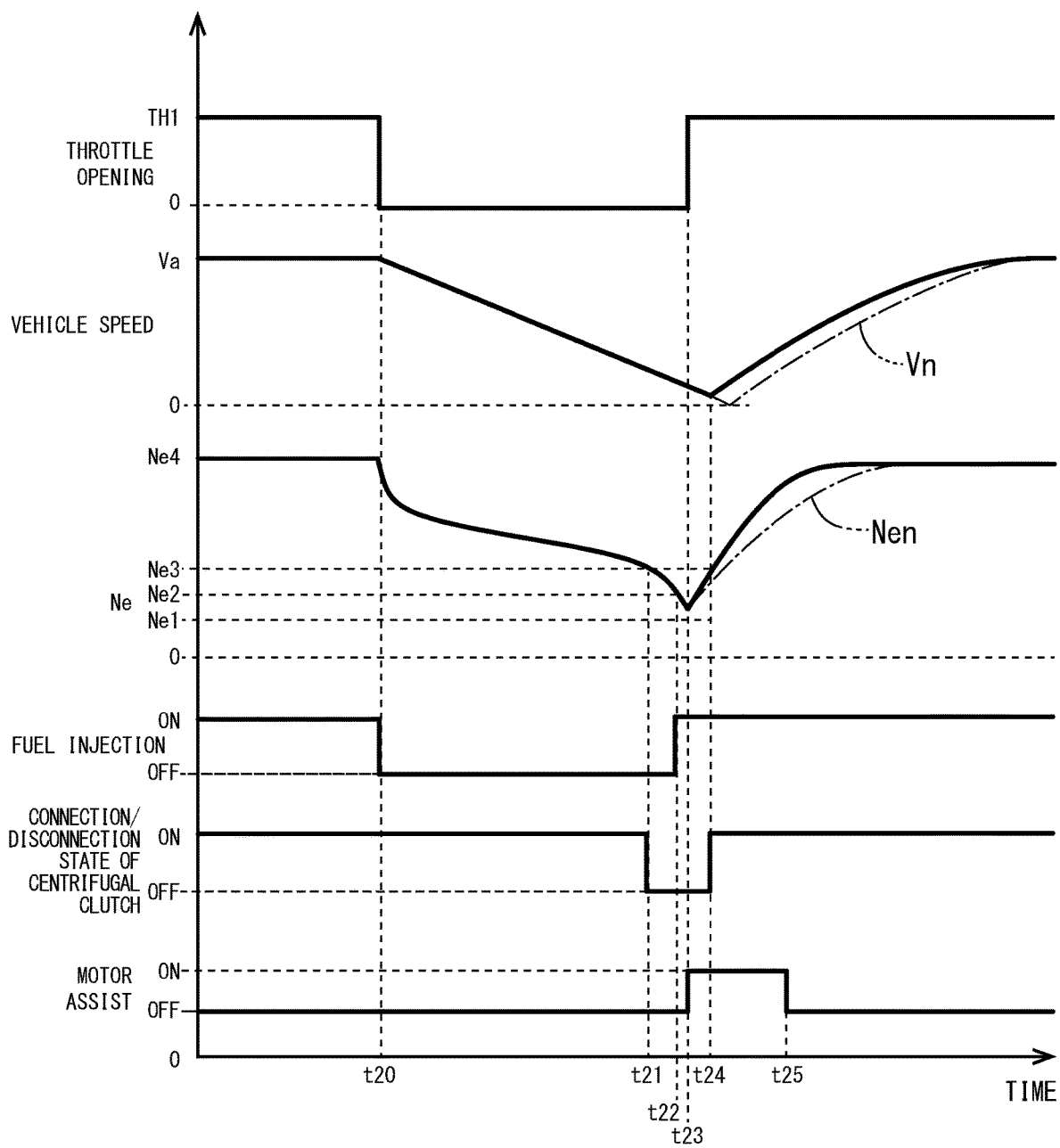
FIG. 7 is a time chart (pattern 2) depicting a flow in the case where a throttle operation is performed after the centrifugal clutch is disconnected with deceleration of the motorcycle.

FIG. 7 is a time chart depicting a flow in the case where a throttle operation is performed after the centrifugal clutch C is disconnected with deceleration of the motorcycle 1. In particular, a flow in the case of a "pattern 2" in which the throttle operator 47 is operated for opening within a period after the engine speed Ne becomes equal to or lower than the injection restart speed Ne2 until it becomes the idle speed Ne1.

At time t=0, the motorcycle 1 is travelling with the throttle opening TH1 and at the vehicle speed Va and the engine speed Ne4. At this time, the fuel injection is in an on state; the centrifugal clutch is in an on state; and the motor assist is in an off state.

At time t20, the throttle opening TH is reduced to zero by the driver, and the fuel injection is changed over to an off state. At time t21, the engine speed Ne becomes equal to or lower than the centrifugal clutch disconnection speed Ne3, and the centrifugal clutch C is changed over to a disconnection state. Then, at time t22, the engine speed Ne becomes equal to or lower than the injection restart speed Ne2, and fuel injection is restarted in order to smoothly transit to idle operation.

Then, in this "pattern 2," after fuel injection is restarted at time t22, the throttle opening TH is opened rapidly to the predetermined opening TH1 at time t23 before the engine speed Ne decreases to the idle speed Ne1.

In response to the rapid opening, the ECU 100 starts normal fuel injection and executes acceleration assist by the ACG starter motor 8 to quickly increase the engine speed Ne. In particular, at time t23, normal fuel injection of the fuel injection system 52 is started by the idle stop controlling unit 58, and acceleration assist driving of the ACG starter motor 8 is started by the acceleration assist controlling unit 53. Consequently, the engine speed Ne increases quickly in comparison with Nen (indicated by a one-dot chain line in FIG. 7) in the case where there is no acceleration assist. As a result, the centrifugal clutch C is connected at time t24, and the timing at which the vehicle speed V starts its increase becomes earlier in comparison with Vn (indicated by a one-dot chain line in FIG. 7) in the case where there is no acceleration assist, and the acceleration response is improved.

Figure 8:
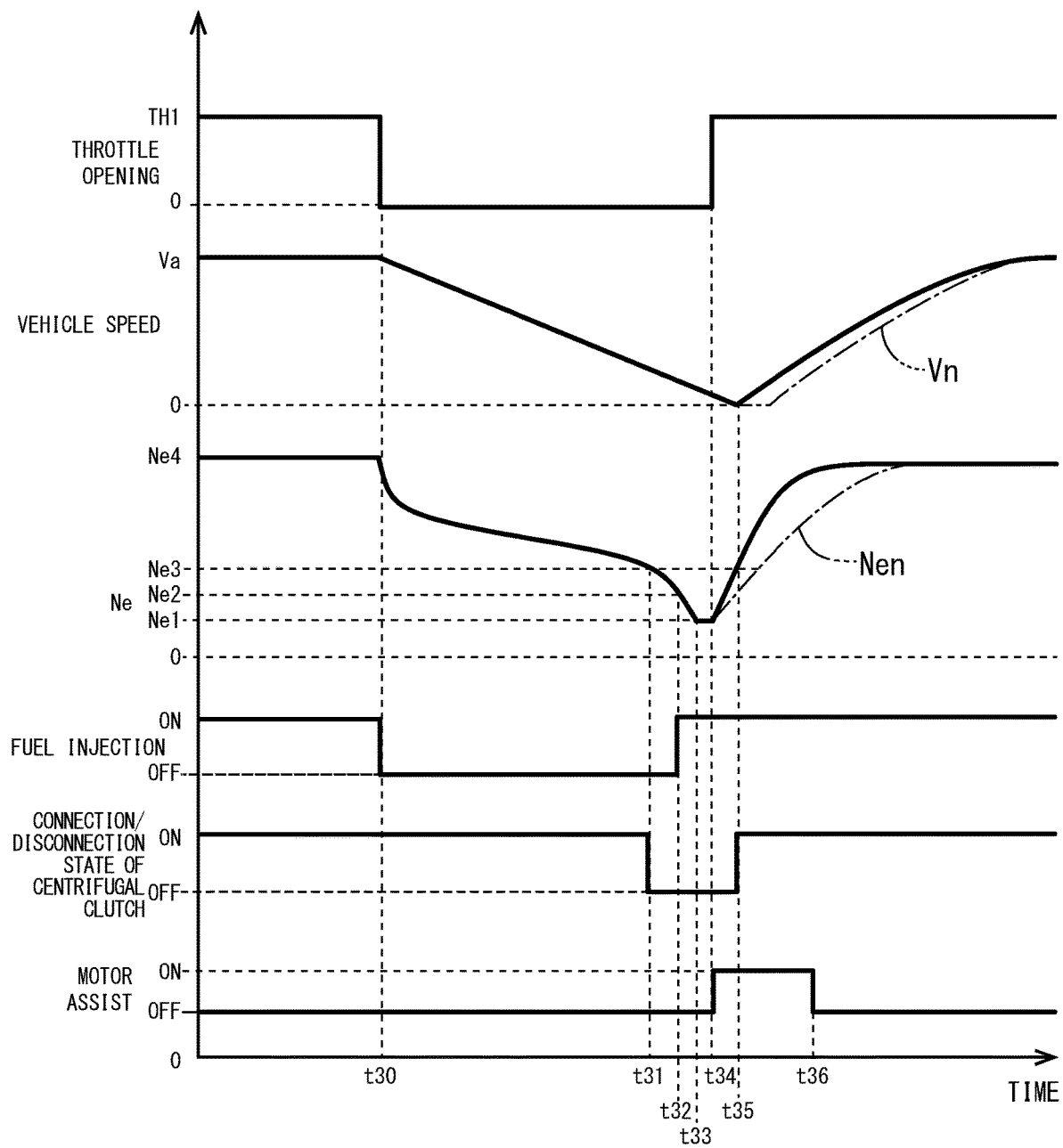
FIG. 8 is a time chart (pattern 3) depicting a flow in the case where a throttle operation is performed after the centrifugal clutch is disconnected with deceleration of the motorcycle.

FIG. 8 is a time chart depicting a flow in the case where a throttle operation is performed after the centrifugal clutch C is disconnected with deceleration of the motorcycle 1. In particular, a flow in the case of a "pattern 3" in which the throttle operator 47 is operated for opening during idle operation at the idle speed Ne1.

At time t=0, the motorcycle 1 is travelling with the throttle opening TH1 and at the vehicle speed Va and the engine speed Ne4. At this time, the fuel injection is in an on state; the centrifugal clutch is in an on state; and the motor assist is in an off state.

At time t30, the throttle opening TH is reduced to zero by the driver, and the fuel injection is changed over to an off state. At time t31, the engine speed Ne becomes equal to or lower than the centrifugal clutch disconnection speed Ne3, and the centrifugal clutch C is changed over to a disconnection state. Then, at time t32, the engine speed Ne becomes equal to or lower than the injection restart speed Ne2, and fuel injection is restarted in order to smoothly transit to idle operation. Then, at time t33, idle operation is started with the idle speed Ne1.

In this "pattern 3," at time t34 during idle operation, the throttle opening TH is opened rapidly to the predetermined opening TH1. In response to the rapid opening, the ECU 100 starts normal fuel injection and executes acceleration assist by the ACG starter motor 8 to quickly increase the engine speed Ne. In particular, at time t34, normal fuel information of the fuel injection system 52 is started by the idle stop controlling unit 58, and acceleration assist driving of the ACG starter motor 8 is started by the acceleration assist controlling unit 53. As a result, the engine speed Ne increases quickly in comparison with Nen (indicated by a one-dot chain line in FIG. 8) in the case where there is no acceleration assist. Consequently, the centrifugal clutch C is connected at time t35 and the timing at which the vehicle speed V starts increase becomes earlier in comparison with Vn (indicated by a one-dot chain line in FIG. 8) in the case where there is no acceleration assist, and the acceleration response is improved.

Figure 9:
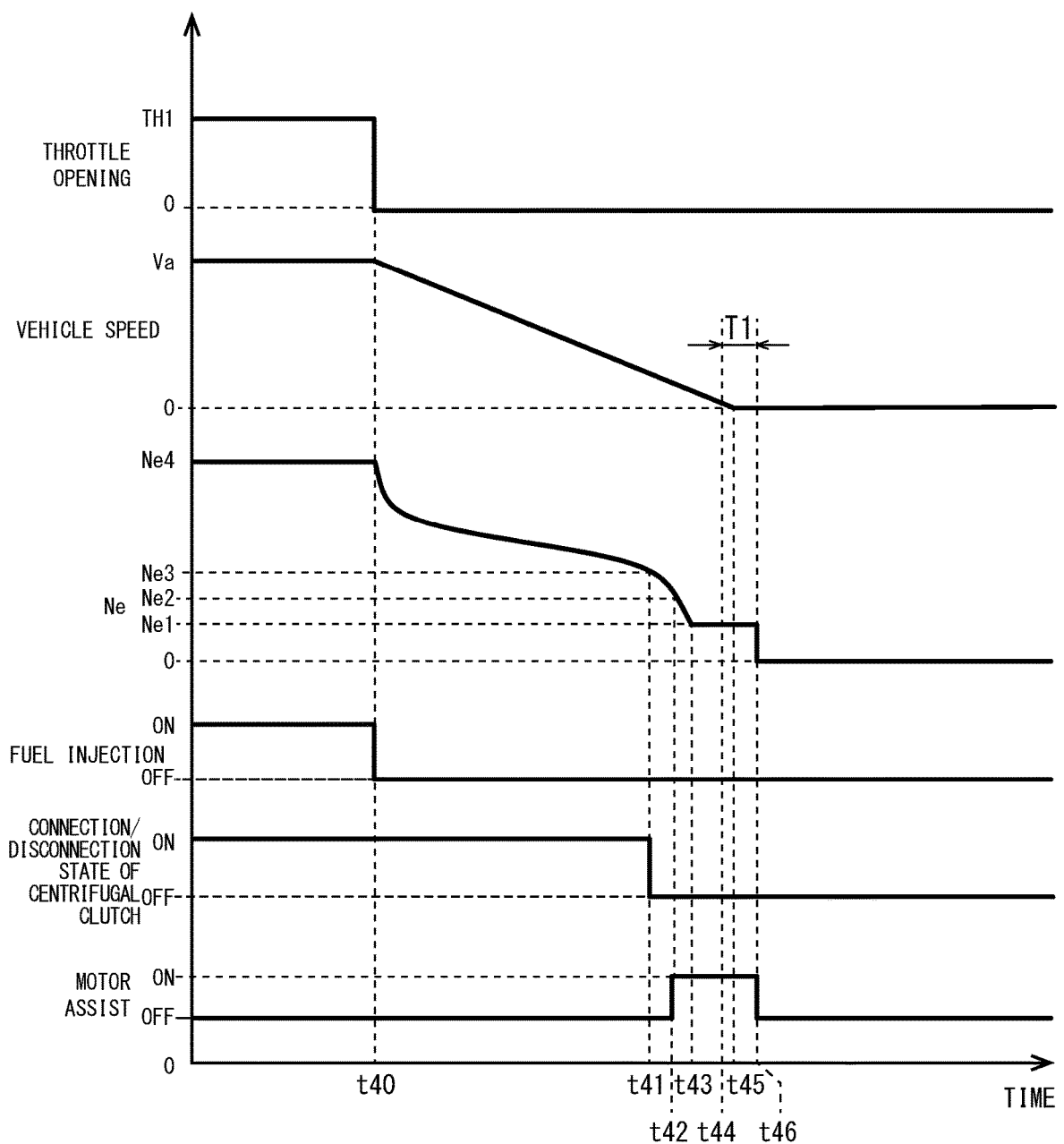
FIG. 9 is a time chart depicting a flow when the motorcycle enters an idle stop state through idle assist by the ACG starter motor with deceleration of the motorcycle.

FIG. 9 is a time chart depicting a flow when the motorcycle 1 enters an idle stop state through motor idle control by the ACG starter motor 8 with deceleration of the motorcycle 1. At time t=0, the motorcycle 1 is travelling with the throttle opening TH1 and at the vehicle speed Va and the engine speed Ne4. At this time, the fuel injection is in an on state; the centrifugal clutch is in an on state; and the motor assist is in an off state.

At time t40, the throttle opening TH is reduced to zero by the driver in order to decelerate the vehicle. In the present embodiment, the fuel injection is changed over to an off state in response to that the throttle opening TH decreases to zero. The vehicle speed V and the engine speed Ne start decrease in response to the injection stop. At time t41, the engine speed Ne becomes equal to or lower than the centrifugal clutch disconnection speed Ne3, and the centrifugal clutch C is changed over to a disconnection state.

At time t42, the engine speed Ne becomes equal to or lower than the injection restart speed Ne2. Here, the present embodiment is configured such that, in order to further reduce the fuel consumption amount, motor idle control for performing idle operation with driving force of the ACG starter motor 8 is executed. Therefore, at time t42, idle assist for transiting to motor idle control smoothly is started in place of restarting of injection.

At time t43, motor idle operation with the idle speed Ne1 is started. At this time, the motorcycle 1 is still in deceleration and the vehicle speed V does not become zero as yet. At time t44, the vehicle speed V becomes equal to or lower than a predetermined value (for example, 3 km/h), and thereupon, the idle stop inrush timer starts counting. At time t45, the vehicle speed V becomes zero, and at time t46, the count value started at time t44 reaches a predetermined time period (for example, 0.5 seconds) T1, and thereupon, the idle assist is turned off and the engine E enters a temporarily stopping state.

Figure 10:
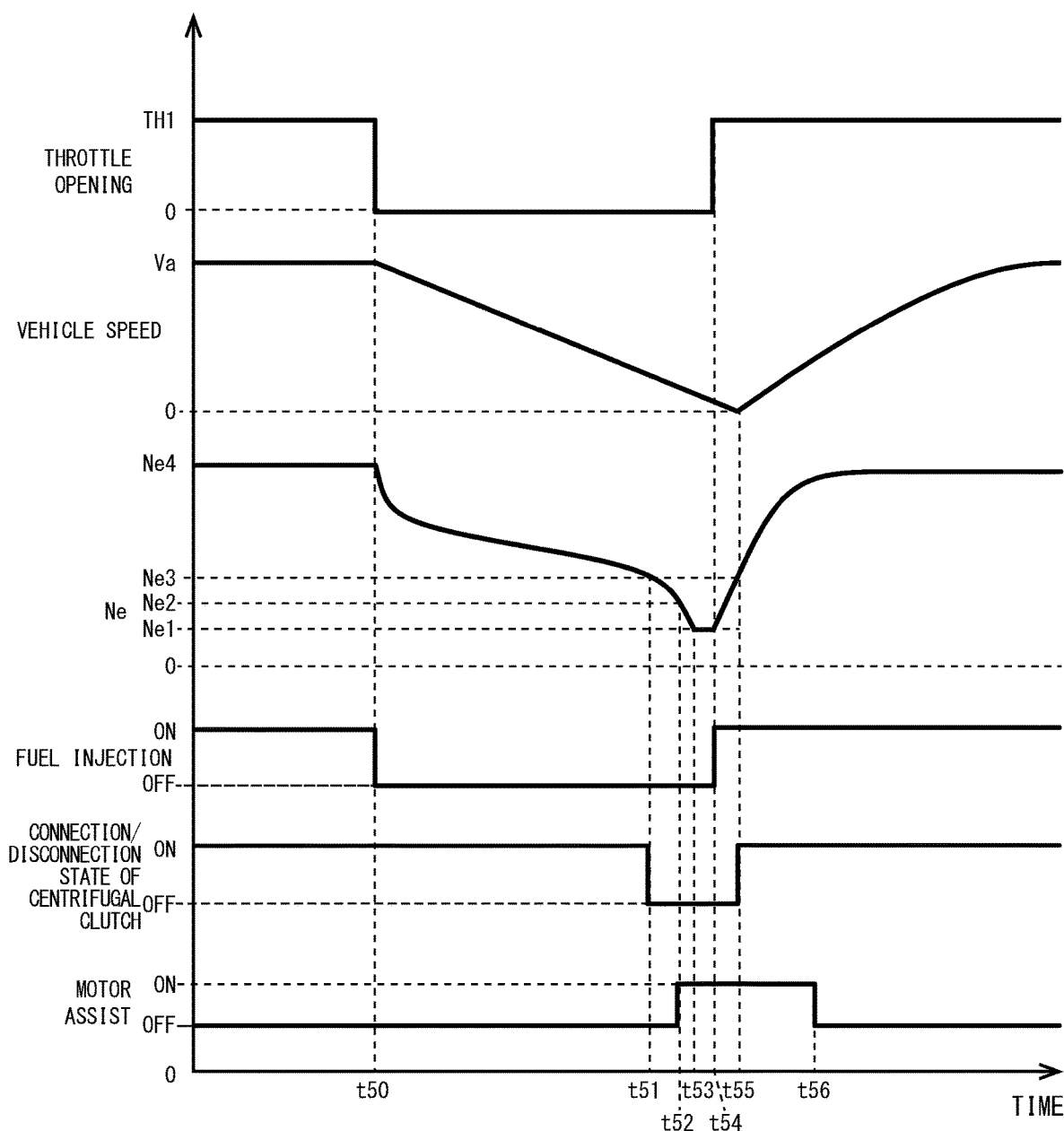
FIG. 10 is a time chart depicting a flow in the case where a throttle operation is performed during motor idling by the ACG starter motor with deceleration of the motorcycle.

FIG. 10 is a time chart depicting a flow in the case where a throttle operation is performed during motor idling by the ACG starter motor 8 with deceleration of the motorcycle 1. At time t=0, the motorcycle 1 is travelling with the throttle opening TH1 and at the vehicle speed Va and the engine speed Ne4. At this time, the fuel injection is in an on state; the centrifugal clutch is in an on state; and the motor assist is in an off state.

At time t50, the throttle opening TH is decreased to zero by the driver, and the fuel injection is changed over to an off state. At time t51, the engine speed Ne becomes equal to or lower than the centrifugal clutch disconnection speed Ne3, and the centrifugal clutch C is changed over to a disconnection state. Then, at time t52, the engine speed Ne becomes equal to or lower than the injection restart speed Ne2, and idle assist is started in order to smoothly transit to motor idle operation. Then, at time t53, motor idle operation with the idle speed Ne1 is started.

In this time chart, at time t54 during motor idle operation, the throttle opening TH is rapidly opened to the predetermined opening TH1. In response to the rapid opening, the ECU 100 starts normal fuel injection and executes acceleration assist for increasing the speed of rotation of the ACG starter motor 8 to quickly increase the engine speed Ne. As a result, the engine speed Ne increases quickly and the centrifugal clutch C is connected at time t55, and the acceleration response is improved.

Figure 11:
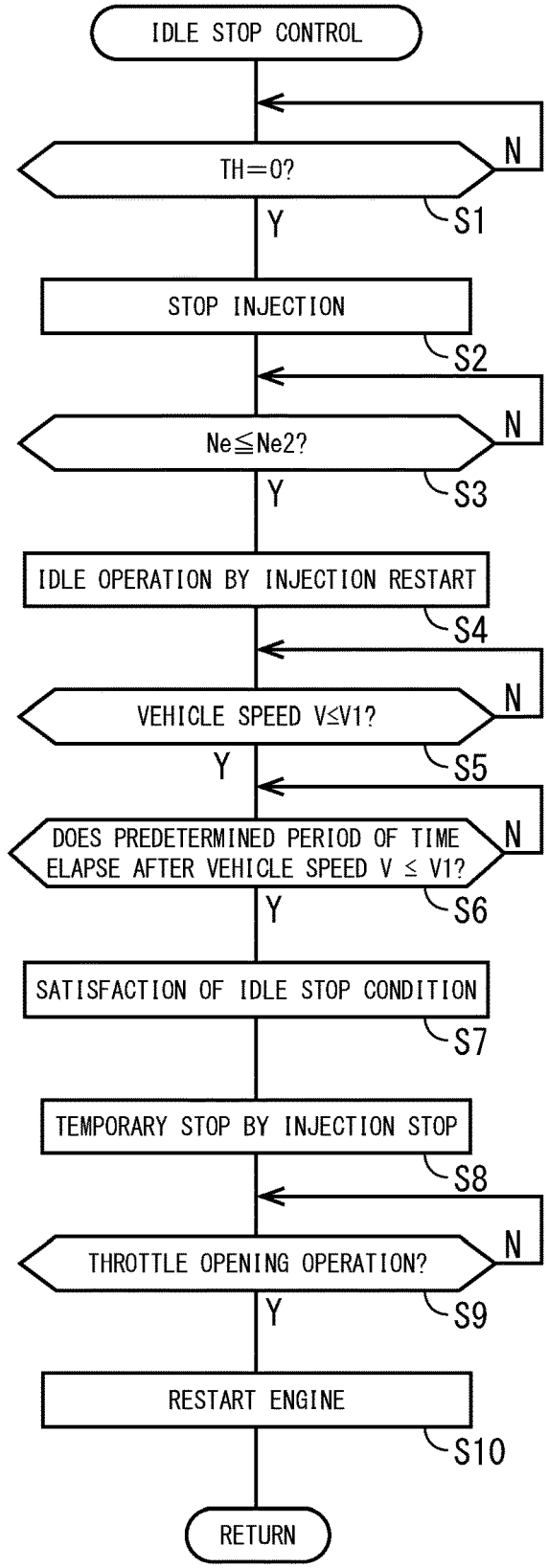
FIG. 11 is a flow chart depicting a procedure of idle stop control according to the present embodiment.

FIG. 11 is a flow chart depicting a procedure of idle stop control according to the present embodiment. This flow chart corresponds to the flow of the time chart depicted in FIG. 5 till engine temporary stop by idle stop. At step S1, it is decided whether or not the throttle opening TH is TH=0 (zero). If an affirmative decision is made at step S1, then the processing advances to step S2, at which fuel injection is stopped. It is to be noted that also it is possible to execute this stop of fuel injection upon deceleration using that the deceleration of the vehicle speed detected by the vehicle speed sensor 46 exceeds a predetermined value or the like as a trigger.

At step S3, it is decided whether or not the engine speed Ne is equal to or lower than the injection restart speed Ne2. If an affirmative decision is made at step S3, then the processing advances to step S4, at which idle operation by restart of injection is started.

Then, at step S5, it is decided whether or not the vehicle speed V is equal to or lower than a predetermined value V1 (for example, 3 km/h) for vehicle stop decision, and if an affirmative decision is made, then the processing advances to step S6. At step S6, it is decided whether or not a predetermined period T1 of time (for example, 0.5 seconds) elapses after the vehicle speed V becomes equal to or lower than the predetermined value V1. If an affirmative decision is made at step S6, then the processing advances to step S7.

At step S7, an idle stop condition is satisfied, for example, by that the throttle opening TH is zero and the seating sensor 49 is in an on state in addition to the condition of the vehicle speed V. Together with this, at step S8, the engine E is temporarily stopped by the stop of fuel injection. At step S9, it is decided whether or not a throttle opening operation is performed during the temporary stop of the engine E. If an affirmative decision is made at step S9, then the processing advances to step S10, at which the ACG starter motor 8 is driven to restart the engine E, thereby, ending the series of control. It is to be noted that, if a negative decision is made at step S1, S3, S5, S6 or S9, the processing returns to the respective decision.

Figure 12:
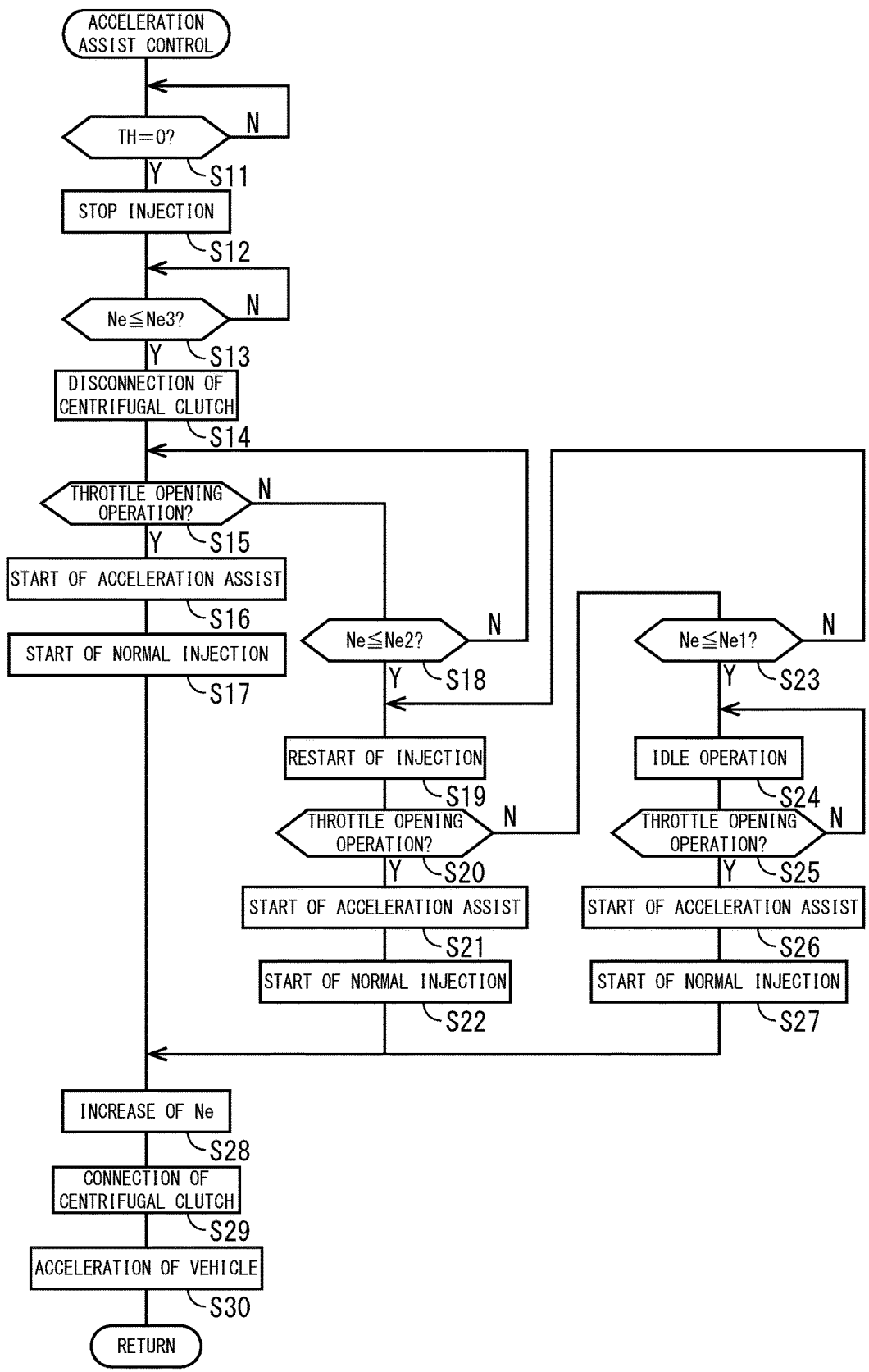
FIG. 12 is a flow chart depicting a procedure of acceleration assist control according to the present embodiment.

FIG. 12 is a flow chart depicting a procedure of acceleration assist control according to the present embodiment. This flow chart corresponds to the flows of the time charts of FIGS. 6, 7 and 8. At step S11, it is decided whether or not the throttle opening TH is TH=0 (zero). If an affirmative decision is made at step S11, then the processing advances to step S12, at which fuel injection is stopped.

At step S13, it is decided whether or not the engine speed Ne is equal to or lower than the centrifugal clutch disconnection speed Ne3. If an affirmative decision is made at step S13, then the processing advances to step S14, at which the centrifugal clutch C is disconnected.

At step S15, it is decided whether or not the throttle operator 47 is operated for opening, and if an affirmative decision is made, then the processing advances to step S16. At step S16, acceleration assist control by the ACG starter motor 8 is executed, and then, at step S17, normal injection is started, whereafter the processing advances to step S28.

On the other hand, if a negative decision is made at step S15, then the processing advances to step S18, at which it is decided whether or not the engine speed Ne is equal to or lower than the injection restart speed Ne2. If an affirmative decision is made at step S18, then the processing advances to step S19, at which fuel injection is restarted. Then, at step S20, it is decided whether or not the throttle operator 47 is operated for opening, and if an affirmative decision is made, then the processing advances to step S21. At step S21, acceleration assist control by the ACG starter motor 8 is executed, and then, at step S22, normal injection is started, whereafter the processing advances to step S28. It is to be noted that, if a negative decision is made at step S18, then the processing returns to the decision at step S15.

Furthermore, if a negative decision is made at step S20, then the processing advances to step S23, at which it is decided whether or not the engine speed Ne is equal to or lower than the idle speed Ne1. If an affirmative decision is made at step S23, then the processing advances to step S24, at which idle operation is started. Then, at step S25, it is decided whether or not the throttle operator 47 is operated for opening, and if an affirmative decision is made, then the processing advances to step S26. At step S26, acceleration assist control by the ACG starter motor 8 is executed, and then, at step S27, normal injection is started, whereafter the processing advances to step S28. It is to be noted that, if a negative decision is made at step S25, then the processing returns to step S24.

At step S28, the engine speed Ne increases with the start of the acceleration assist control by the ACG starter motor 8 and normal fuel injection. Consequently, at step S29, the centrifugal clutch C is changed over to a connection state, and at step S30, the vehicle starts acceleration, thereby ending the series of control.

As described above, with the acceleration assist control according to the present embodiment, when a throttle operation is performed after the engine speed Ne becomes equal to or lower than the centrifugal clutch disconnection speed Ne3 at which the centrifugal clutch C is disconnected, acceleration assist control by the ACG starter motor 8 is executed. Therefore, it is possible to reduce the time lag before the centrifugal clutch C is connected and improve the acceleration response. It is to be noted that, in the case where a throttle operation is performed in an engine stop state by idle stop control, cranking by the ACG starter motor 8 and normal fuel injection are started simultaneously.

Figure 13:
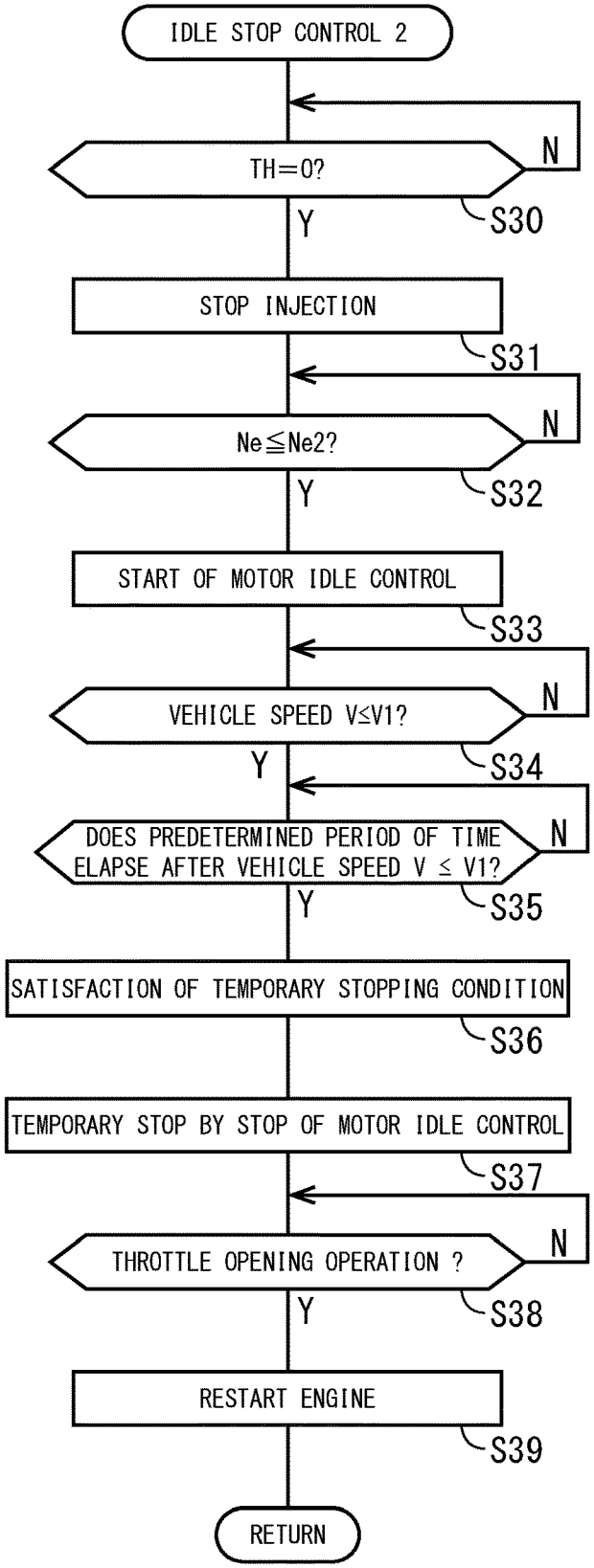
FIG. 13 is a flow chart depicting a procedure of idle stop control 2 according to the present embodiment.

FIG. 13 is a flow chart depicting a procedure of idle stop control 2 according to the present embodiment. This flow chart corresponds to the flow of the time chart of FIG. 9 till engine temporary stop by idle stop. At step S30, it is decided whether or not the throttle opening TH is TH=0 (zero). If an affirmative decision is made at step S30, then the processing advances to step S31, at which fuel injection is stopped.

At step S32, it is decided whether or not the engine speed Ne is equal to or lower than the injection restart speed Ne2. If an affirmative decision is made at step S32, then the processing advances to step S33, at which motor idle operation by the ACG starter motor 8 is started.

At step S34, it is decided whether or not the vehicle speed V is equal to or lower than the predetermined value V1 (for example, 3 km/h) for vehicle stop decision, and if an affirmative decision is made, then the processing advances to step S35. At step S35, it is decided whether or not the predetermined period T1 of time (for example 0.5 seconds) elapses after the vehicle speed V becomes equal to or lower than the predetermined value V1. If an affirmative decision is made at step S35, then the processing advances to step S36.

At step S36, an idle stop condition is satisfied by that, for example, the throttle opening TH is zero and the seating sensor 49 is an on state in addition to the satisfaction of the condition of the vehicle speed V. With this, at step S37, the engine E is temporarily stopped by the stop of the motor idle control. At step S38, it is decided whether or not a throttle opening operation is performed during temporary stopping of the engine E. If an affirmative decision is made at step S38, then the processing advances to step S39, at which the ACG starter motor 8 is driven to restart the engine E, thereby ending the series of control. It is to be noted that, if a negative decision is made at step S30, S32, S34, S35 or S38, then the processing returns to the respective decision.

With the motor idle control described above, it is possible to reduce the fuel consumption amount during idle operation to zero by causing the engine to perform idle operation with the driving force of the ACG starter motor 8. It is to be noted that the idle assist control may be configured such that, in addition to idle operation only with the driving force of the ACG starter motor 8, idle operation is executed by cooperation of motor driving force and engine driving force to reduce the fuel consumption amount.

Figure 14:
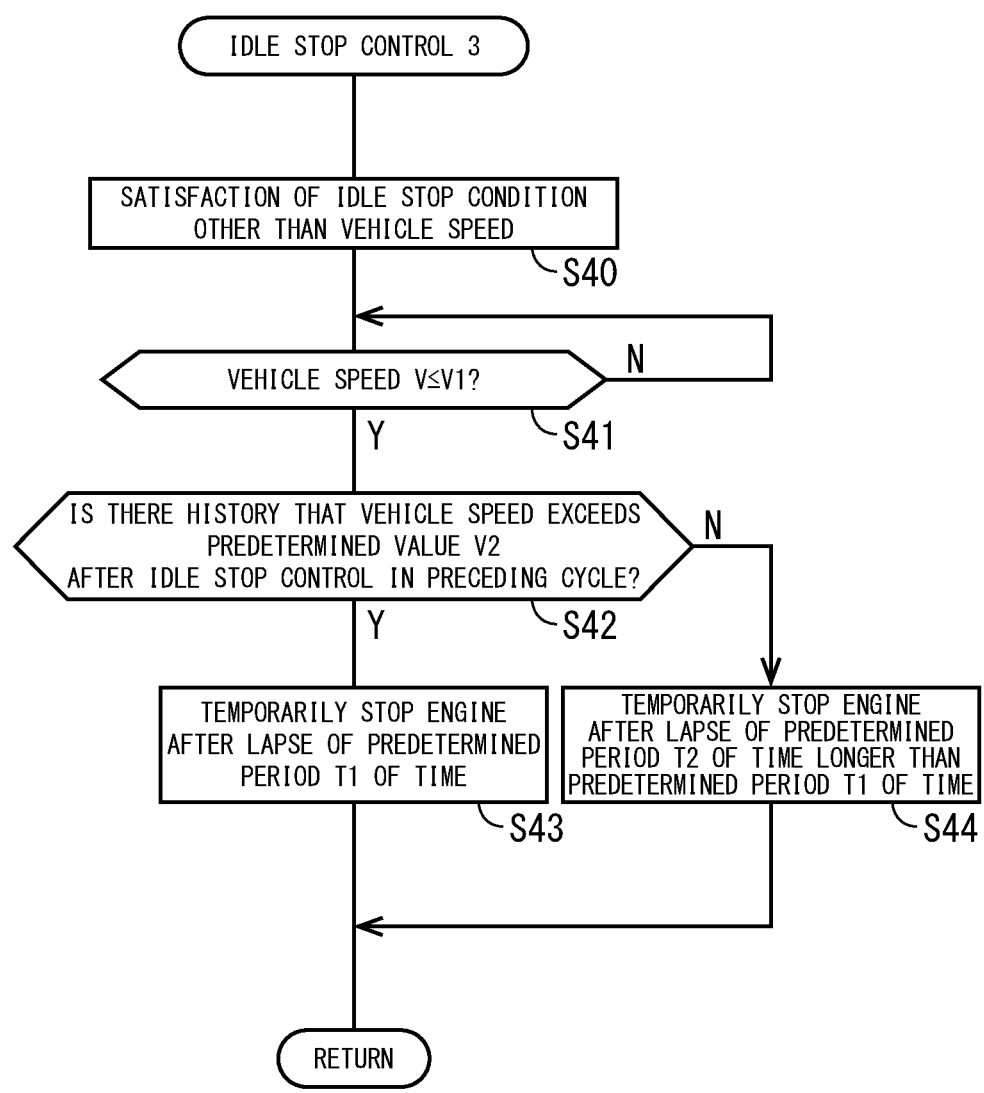
FIG. 14 is a flow chart depicting a procedure of idle stop control 3 according to the present embodiment.

FIG. 14 is a flow chart depicting a procedure of idle stop control 3 according to the present embodiment. Although it is possible to include, in the conditions for temporarily stopping the engine E by idle stop control, the condition that the predetermined period T1 of time (for example, 0.5 seconds) elapses after the vehicle speed V becomes equal to or lower than the predetermined value V1 (for example, 3 km/h) as described hereinabove, if the predetermined period of time is changed over in response to a travel history, then it is possible to make the idle stop control more comfortable.

At step S40, an idle stop condition other than the vehicle speed, for example, that the throttle opening TH is 0 and the seating sensor 49 is in an on state or the like, is satisfied, and the processing advances to step S41. At step S41, it is decided whether or not the vehicle speed V is equal to or lower than the predetermined value V1.

If an affirmative decision is made at step S41, then the processing advances to step S42, at which it is decided whether or not there is a history that the vehicle speed exceeds a predetermined value V2 (for example, 13 km/h) after the idle stop control in the preceding cycle. Then, if an affirmative decision is made at step S42, then the processing advances to step S43, at which the engine E is temporarily stopped after lapse of the predetermined period T1 of time (for example, 0.5 seconds). On the other hand, if a negative decision is made at step S42, then the processing advances to step S44, at which the engine E is temporarily stopped after lapse of a second predetermined period T2 of time (for example, 3 seconds), thereby ending the series of control.

According to this control, while, in the case of signal waiting after normal travel in which the speed is raised to a speed equal to or higher than a certain level, the engine stops in a short period of time, in the case of travel in a traffic jam in which travel at a low speed and stop are repeated or in a like case, the period of time until the engine stops is elongated. According to this setting, there is an advantageous effect that, although, in a vehicle that includes the centrifugal clutch C, a time lag occurs until the centrifugal clutch C is connected upon restarting from an idle stop state, it is possible to prevent stopping and restarting of the engine upon traveling in a traffic jam from being repeated and cause a response delay to be prevented from being felt. Further, if stopping and restarting of the engine are repeated, then also the fuel improvement effect decreases, and therefore, the setting described above is also a setting that reduces the burden on the battery upon traveling in a traffic jam and makes improvement of the comprehensive energy efficiency. It is to be noted that the values of the predetermined periods T1 and T2 of time and the predetermined values V1 and V2 of the vehicle speed can be changed suitably in accordance with a vehicle model or the like.

It is to be noted that the form of the motorcycle, the structure and the operating speed of the centrifugal clutch, the structure and the form of the transmission, the structure and the form of the ACG starter motor, the execution conditions for idle stop control, execution conditions for acceleration assist control and idle assist control and so forth are not limited to those of the embodiment described hereinabove and can be altered in various manners. The engine control device for a vehicle according to the present invention can be applied not only to a motorcycle but also to a three-wheeled saddle riding vehicle, a four-wheeled vehicle and so forth that include a centrifugal clutch.

REFERENCE SIGNS LIST

1 . . . Motorcycle (vehicle), 2 . . . Crankshaft, 8 . . . ACG starter motor (motor), 45 . . . Ne sensor, 47 . . . Throttle grip (throttle operator), 50 . . . Throttle opening sensor, 53 . . . Acceleration assist controlling unit, 54 . . . Centrifugal clutch disconnection Ne storage unit, 55 . . . Engine start controlling unit, 56 . . . Power generation controlling unit, 57 . . . ACG starter motor controlling unit, 58 . . . Idle stop controlling unit, 100 . . . ECU (control unit), C . . . Centrifugal clutch, E . . . Engine, Ne1 . . . Idle speed, Ne2 . . . Injection restart speed, Ne3 . . . Centrifugal clutch disconnection speed

The invention claimed is:

1. An engine control device for a vehicle applied to a vehicle that includes a mechanical centrifugal clutch for connecting and disconnecting driving force to be transmitted from an engine to a driving wheel, wherein
   the vehicle includes a throttle operator configured to adjust output power of the engine, a motor configured to rotate a crankshaft of the engine, and a control unit configured to control the motor and a fuel injection system,
   the control unit executes injection stopping control for stopping fuel injection during deceleration of the vehicle and executes acceleration assist control for rotating the crankshaft with the motor from the state where the motor assist with the motor is off when an opening operation of the throttle operator is performed after an engine speed becomes equal to or lower than a centrifugal clutch disconnection speed at which the centrifugal clutch is disconnected and when the engine speed is within a range of an idle speed or more,
   when the engine speed decreases to an injection restart speed that is lower than the centrifugal clutch disconnection speed after fuel injection by the injection stopping control stops, the control unit causes the fuel injection to be restarted,
   the injection restart speed at which the fuel injection is to be restarted is set higher than the idle speed,
   the control unit causes the fuel injection to be restarted when the opening operation of the throttle operator is performed within a period after the engine speed becomes equal to or lower than the centrifugal clutch disconnection speed until the engine speed decreases to the injection restart speed, and
   the acceleration assist control is executed for an amount of time that corresponds to an amount of the opening operation of the throttle operator with the amount of time including an appreciable portion thereof beyond the point in time that the centrifugal clutch returns to a connected state.

* * * * *